United States Patent
Cherpinsky et al.

(10) Patent No.: US 6,872,276 B2
(45) Date of Patent: Mar. 29, 2005

(54) THIN FILM LAMINATION DELAMINATION PROCESS TO CREATE VERY THIN FILM ON FABRIC

(75) Inventors: Michael J. Cherpinsky, Dayton, NJ (US); Yuan-Ping Robert Ting, Plainsboro, NJ (US)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 10/351,878

(22) Filed: Jan. 27, 2003

(65) Prior Publication Data

US 2004/0144480 A1 Jul. 29, 2004

(51) Int. Cl.$^7$ .......................... B44C 1/17; B29C 47/06; B32B 31/20; B32B 7/12; B41M 3/12
(52) U.S. Cl. ................. 156/230; 156/231; 156/247; 156/244.11; 156/289; 427/148; 428/343; 428/349; 428/352; 428/914
(58) Field of Search ................. 156/230, 233, 156/239, 240, 241, 247, 277, 289, 242, 244.11, 231; 427/146, 147, 148; 428/40.1, 40.9, 41.1, 41.7, 41.8, 42.1, 42.3, 195.1, 200, 202, 203, 209, 343, 344, 347, 352, 914, 915

(56) References Cited

U.S. PATENT DOCUMENTS

| 4,677,017 | A | | 6/1987 | DeAntonis et al. ......... 428/214 |
|---|---|---|---|---|
| 4,826,955 | A | | 5/1989 | Akkapeddi et al. ......... 528/324 |
| 5,139,878 | A | | 8/1992 | Kim et al. ................ 428/421 |
| 5,200,253 | A | * | 4/1993 | Yamaguchi et al. ..... 428/195.1 |
| 5,281,499 | A | * | 1/1994 | Bussard ..................... 430/1 |
| 5,510,911 | A | * | 4/1996 | Sharpe et al. ............... 359/1 |
| 5,541,267 | A | | 7/1996 | Akkapeddi et al. ......... 525/432 |
| 6,495,295 | B1 | * | 12/2002 | Shioda et al. ................. 430/1 |

* cited by examiner

Primary Examiner—J. A. Lorengo
(74) Attorney, Agent, or Firm—Virginia Szigeti; Roger H. Criss

(57) ABSTRACT

A process for transferring a thin polymeric film to either woven or non-woven fabrics by first coextruding the thin polymeric film with a plastic support layer, then adhesively laminating the polymeric film to a fabric, followed by delaminating the support layer. The thin base layer remaining on the fabric imparts desired properties to the fabric while maintaining the soft feel, or drapeability, of the fabric, as opposed to lamination of thicker polymeric films to fabrics.

21 Claims, No Drawings

THIN FILM LAMINATION DELAMINATION PROCESS TO CREATE VERY THIN FILM ON FABRIC

BACKGROUND OF THE INVENTION

Field of the Invention

The invention relates to the lamination and delamination of thin films to fabrics. More particularly, the invention pertains to a process for the adhesion of thin films to either woven or non-woven fabrics for the purpose of improving the drapeability of the fabrics as compared to the lamination of thicker films to fabrics.

BACKGROUND OF THE INVENTION

Film to fabric laminations are well known techniques that are employed in order to impart certain properties of a polymeric film to a woven or non-woven fabric. For example, it may be desirable to impart properties such as opacity, controlled barrier or gas transport, moisture resistance or room darkness to a fabric, thus increasing the potential applications for which that fabric may be used. However, while it may be desirable in certain applications for the film-fabric laminations to have such improved properties as just mentioned, it is also important that the fabric retain a soft feel. For example, film to fabric laminations are frequently used in forming surgical gowns having improved strength and a good moisture barrier, however the material must also feel soft so that it is comfortable to the person who is wearing it. Additionally, when forming other personal care products such as diapers or surgical wraps, the soft feel of the material is of utmost importance to the user. Film to fabric laminates are also used in other applications, such as textile applications, in which a soft drape is an important factor to a consumer.

One problem associated with current film-fabric lamination techniques is the unavoidable limitations on the thicknesses of the films to be laminated onto the fabrics. Specifically, known techniques require that thick films (i.e. films having a thickness of at least 10 $\mu$m (0.40 mil)) be laminated to the fabric. This is because of the processing limitations of current coater and lamination equipment, specifically at the very high tolerances of tension control required to laminate thin polymer films to lightweight fabrics. However, films having a thickness of 10 $\mu$m or greater are typically unable to retain the soft feel of the fabric. In addition, such thick film laminations are disadvantageous because they tend to reduce the flexibility of the fabric. Flexibility of the fabric is often an important feature of a film-fabric lamination.

Therefore, there exists a need in the art to have a thin film-fabric laminate film (i.e. a film-fabric laminate having a film thickness of less than about 10 $\mu$m, preferably 8 $\mu$m or less) that can be economically manufactured and maintains the flexibility and soft feel of the fabric as compared to thicker film-fabric laminates.

SUMMARY OF THE INVENTION

The invention provides a thin film lamination-delamination process comprising the steps of:

a) providing a plastic support layer having first and second surfaces;

b) applying at least one thin plastic base layer, having first and second surfaces, onto at least one surface of said support layer, with the first surface of said at least one thin base layer in contact with a surface of said support layer;

c) applying an adhesive layer onto the second surface of said second base layer;

d) attaching the base layer to a fabric via the adhesive layer; and e) separating the support layer from the base layer, such that the base layer remains attached to the fabric.

The invention also provides a multilayered film comprising:

a) a plastic support layer having first and second surfaces;

b) at least one thin plastic base layer, having first and second surfaces, on at least one of said surfaces of said support layer, with the first surface of said at least one thin base layer in contact with a surface of said support layer;

c) an adhesive layer on the second surface of said thin base layer; and d) a fabric attached to said thin base layer via the adhesive layer.

The invention further provides a multilayered film comprising:

a) a fabric having a surface; and b) a thin plastic base layer attached to the surface of said fabric; wherein said base layer has a thickness of from about 1 $\mu$m to about 10 $\mu$m, and wherein said thin base layer is adhesively attached to the fabric.

The present invention overcomes the problems of the prior art by enabling a very thin film less than about 8 $\mu$m (0.32 mil) to be laminated to a woven or non-woven fabric. The invention enables a thin base layer to be laminated to a fabric by first applying the thin base layer onto a support or carrier layer and then transferring the thin film from the support layer to the fabric by laminating the support layer to the fabric via an intermediate adhesive layer, and then stripping the support from the fabric, leaving the thin base layer on the fabric.

DETAILED DESCRIPTION OF THE PREFERRED EMBODIMENTS

The invention provides a thin film to fabric lamination-delamination process in which a thin, self-supporting, polymeric base layer is transferred from a plastic support layer to a fabric. The support layer has first and second surfaces and is coextruded with a polymeric material which forms a thin base layer having first and second surfaces with the first surface of the base layer on the second surface of the support layer. An adhesive layer is then applied onto the second surface of the base layer. This structure is then laminated to a fabric receiver sheet such that the adhesive layer is in contact with a surface of the fabric. After this lamination step, the fabric and support layer are separated, leaving the base layer and adhesive layer on the fabric. The result is a material that is capable of producing articles having a soft feel.

The plastic support layer may comprise any suitable polymeric material which has a thermal stability suitable for an adhesive lamination process. Suitable materials include polyolefins, polyamides, polyvinyl chloride (PVC), ethylene vinyl acetate (EVA), polyesters, cyclo olefin polymers and blends thereof. In the preferred embodiment of the invention, the support layer comprises a polyamide.

Suitable polyamides (nylons) within the scope of the invention non-exclusively include homopolymers or copolymers selected from aliphatic polyamides and aliphatic/ aromatic polyamides having a molecular weight of from about 10,000 to about 100,000. General procedures useful for the preparation of polyamides are well known to the art, including the self-condensation of lactams and the reaction products of diacids with diamines.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here. Of these polyamides, preferred polyamides include nylon 6, nylon 6,6, nylon 6/6,6, nylon 6,6/6 as well as mixtures of the same. The most preferred polyamide is nylon 6.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly (tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267.

Suitable polyolefins for use herein include polymers of alpha-olefin monomers having from about 2 to about 6 carbon atoms and includes homopolymers, copolymers (including graft copolymers), and terpolymers of alpha-olefins. Illustrative homopolymer examples include ultra low density (ULDPE), low density (LDPE), linear low density (LLDPE), metallocene linear low density polyethylene (m-LLDPE), medium density (MDPE), or high density polyethylene (HDPE); polypropylene; polybutylene; polybutene-1; poly-3-methylbutene-1; poly-pentene-1; poly-4-methylpentene-1; polyisobutylene; polyhexene and combinations thereof.

Polyolefins such as polyethylenes are commonly differentiated based on the density which results from their numbers of chain branches per 1,000 carbon atoms in the polyethylene main chain in the molecular structure. Branches typically are $C_3$–$C_8$ olefins, and which are preferably butene, hexene or octene. For example, HDPE has very low numbers of short chain branches (less than 20 per 1,000 carbon atoms), resulting in a relatively high density, i.e. density ranges from about 0.94 gm/cc to about 0.97 gm/cc. LLDPE has more short chain branches, in the range of 20 to 60 per 1,000 carbon atoms with a density of about 0.91 to about 0.93 gm/cc. LDPE with a density of about 0.91 to about 0.93 gm/cc has long chain branches (20–40 per 1,000 carbon atoms) instead of short chain branches in LLDPE and HDPE. ULDPE has a higher concentration of short chain branches than LLDPE and HDPE, i.e. in the range of about 80 to about 250 per 1,000 carbon atoms and has a density of from about 0.88 to about 0.91 gm/cc. Illustrative copolymer and terpolymers include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). The term polyolefin as used herein also includes acrylonitrilebutadiene-styrene (ABS) polymers, copolymers with vinyl acetate, acrylates and methacrylates and the like. Preferred polyolefins are those prepared from alpha-olefins, most preferably ethylene polymers, copolymers, and terpolymers. The above polyolefins may be obtained by any known process. The polyolefin may have a weight average molecular weight of about 1,000 to about 1,000,000, and preferably about 10,000 to about 500,000. Preferred polyolefins are polyethylene, polypropylene, polybutylene and copolymers, and blends thereof. The most preferred polyolefin is polyethylene. The most preferred polyethylenes are low density polyethylenes.

Coextruded with the support layer is a thin polymeric base layer which may be comprised of one or more layers of polymeric materials. It should be understood that the thin base layer is a self supporting film which is capable of being transferred in whole from one substrate to another. The base layer may comprise polyolefins, polyesters, polyamides, polyurethanes, polycarbonates, thermoplastic elastomers, high temperature polymers such as polyimides and poly ether-ether ketones, and blends thereof. Suitable polyolefins include those listed above. Preferred polyolefins include polypropylene and low density polyethylene. Suitable polyesters include polyethylene terephthalate, polyethylene naphthalate and blends thereof. Suitable high temperature homopolymers, copolymers or blends may be laminated to produce non-flammable laminates in a cost effective manner. The most preferred material is linear low density polyethylene.

The wet adhesive lamination method of transferring the base film to a fabric is accomplished by applying an adhesive directly onto the base layer by any appropriate means in the art, such as by coating or coextrusion and drying in an conventional oven if necessary to remove solvent or water. Any suitable adhesive system may be employed such as chemical cross-linkable, moisture curable, 100% solids, U.V curable, electron beam or pressure sensitive adhesive systems. Preferred adhesives include polyurethanes, epoxies, polyesters, acrylics, anhydride modified polyolefin and blends thereof. Modified polyolefin compositions have at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. The adhesive layer may also optionally comprise a colorant, an ultraviolet light absorber or both.

In the preferred embodiment of the invention, the fabric may comprise either a woven or a non-woven fabric suitable for forming the product desired by the manufacturer. For example, the process of the invention may be used in the manufacture of window shades, wherein the fabric preferably comprises a material suitable for forming window shades.

The support layer and thin base film are preferably attached by coextrusion. For example, the polymeric material for the individual layers, are fed into infeed hoppers of a like number of extruders, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017.

One advantage of coextruded films is the formation of a multilayer film in a one process step by combining molten layers of each of the support and base layers, as well as any other optional film layers, into a unitary film structure. The materials of the support and base layers are chosen so that there is a weak cohesive bond strength between the layers, such that they can be subsequently separated without damage to the layers. The lamination-delamination process of the present invention allows relatively thin base films to be applied onto fabrics as described above.

The thin base layer is attached to the fabric by lamination. Lamination techniques are well known in the art. Typically, laminating is done by positioning the individual layers on one another under conditions of sufficient heat and pressure to cause the layers to combine into a unitary structure. In particular, a structure is formed which comprises the support layer, a thin base layer on a surface of the support layer, an adhesive layer on the thin base layer, and a fabric on the adhesive layer. This structure is then passed through the nip of a pair of heated laminating rollers by techniques well known in the art. Lamination heating may be done at temperatures ranging from about 50° C. to about 175° C., preferably from about 60° C. to about 100° C., at pressures ranging from about 0.034 MPa to about 0.69 MPa, for from about 5 seconds to about 5 minutes, preferably from about less than 1 second to about 1 minute.

After the support layer/base layer/adhesive structure is laminated to the fabric, the support layer is separated from the base layer by delamination, or by pulling the support layer and the fabric apart, using techniques that are well known in the art. This delamination step leaves the base layer on the fabric. In order for the base layer to remain on the fabric, the adhesive bond strength between the base layer and the fabric is stronger than the interlayer bond strength between the base layer and the support layer. In particular, the adhesive bond strength between the base layer and the fabric is at least 3 times the interlayer bond strength between the base layer and the support layer; more preferably the interlayer bond strength between the base layer and the support layer is less than about 35 g/cm, while the adhesive bond strength between the base layer and the fabric is preferably greater than about 200 g/cm, and more preferably greater than about 90 200 g/cm. Therefore, upon pulling the fabric and the support layer apart, the bond between the base layer and the support layer will break, leaving the base layer on the fabric.

Each of the support layer, base layer and adhesive layer may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the overall layer composition.

The combination of the base layer and support layer may be oriented prior to being attached to the fabric. The layers may be drawn to draw ratios typically used in the art, such as draw ratio of from 1.5:1 to 5:1 uniaxially in at least one direction or biaxially in each of its longitudinal and transverse directions.

Although each layer of the multilayer film structure may have a different thickness, the support layer has a preferred thickness of from about 10 $\mu$m to about 80 $\mu$m, more preferably from about 15 $\mu$m to about 65 $\mu$m and most preferably from about 25 $\mu$m to about 50 $\mu$m. The thin base layer has a preferred thickness of from about 1 $\mu$m to about 10 $\mu$m, more preferably from about 3 $\mu$m to about 8 $\mu$m and most preferably from about 4 $\mu$m to about 7 $\mu$m. The adhesive layer has a preferred thickness of from about 1 $\mu$m to about 25 $\mu$m, preferably from about 3 $\mu$m to about 8 $\mu$m, and more preferably from about 4 $\mu$m to about 6 $\mu$m. The thickness of the fabric receiver sheet may vary depending upon the desired application for the film of the invention. While such thicknesses are preferred, it is to be understood that other film thicknesses may be produced to satisfy a particular need and yet fall within the scope of the present invention.

The films of the invention are useful for a variety of end applications, such as for forming window shades, upholstery and other uses. The films are especially useful in producing fabric laminates which do not allow light to pass through them, referred to as room darkening. The films of invention are also useful for further processing steps prior to lamination such as vacuum metallizing. The process of the invention enables thinner base films of over 90 inches (2.3 m) wide to be laminated to wider sheets of fabric than are available using techniques commonly known in the art. Therefore, the utility of such laminates are greatly expanded over other known laminates, with a softer feel to the fabric and at a reduced cost.

It is also within the scope of the invention that a thin base film may be attached on both opposing surfaces of the support layer. In this embodiment, the same steps as described above would be repeated with the second base layer being adhesively laminated to a second fabric receiver sheet, followed by delamination of said support layer.

The following non-limiting examples serve to illustrate the invention.

EXAMPLE 1

A two layer coextruded film of low density polyethylene and polyamide 6 are produced with a polyamide layer thickness of approximately 7 µm and a polyethylene layer of approximately 50 µm. The polyethylene layer is in contact with the chilled casting roll. After casting of the coextruded film the polyamide surface is corona treated to a surface energy level of greater than 50 dynes. Both layers include a silica antiblock to prevent blocking during unrolling.

The coextruded film is then metallized on the polyamide surface via a vacuum metallization process to deposit aluminum. The amount of deposited aluminum is controlled to produce a film with an optical density of greater than 1.5, as required to create a room darkening or blackout effect in the final-laminate.

The metallized side of the coextruded film has a two-parts urethane adhesive applied via a roto-gravure coating process on a Faustel coater/laminator machine. The adhesive is an epoxy/amine or polyol/isocyanate urethane coated at a coat weight of 6.5 g/m$^2$. The adhesive is dried in a conventional forced air tunnel at 70° C. for twenty seconds and then directly laminated to a non-woven fabric using a room temperature combining nipset with sufficient pressure to adhere the metallized coextruded film to the fabric. The subsequent lamination is then wound onto a core.

The laminate is allowed to cure for 24 hours after which the aluminum coated nylon thin film is separated from the supporting polyethylene film with a slitting machine. Both the thin film laminated fabric and the monolayer polyethylene film are simultaneously wound onto separate cores.

The thin film laminated fabric has the same hand and drape as the unlaminated, or receiver, fabric. The thin film-fabric laminate does not allow for the passage of an appreciable amount of light and is room darkening in nature.

EXAMPLE 2

Example 1 is repeated except that there is produced a polyethylene layer thickness of approximately 7 µm and a polyamide layer of approximately 50 µm by coextrusion with the polyamide layer in contact with the chilled casting roll. After casting, the polyethylene surface is corona treated to a surface energy level of greater than 50 dynes.

The polyethylene surface is metallized as in Example 1 and the coextruded film is laminated to a non-woven fabric as in Example 1, with the adhesive between the polyethylene layer and the fabric. via a vacuum metallization process to deposit aluminum on the thin film side.

After curing for 24 hours, the aluminum coated polyethylene thin film is separated from the supporting polyamide film with a slitting machine, with both the thin film laminated fabric and the plain polyamide film being simultaneously wound onto separate cores. Similar results are achieved.

EXAMPLE 3

Example 1 is repeated except that the polyamide layer includes TiO$_2$ pigment which is added as a masterbatch at about 5% to produce a white film.

Similar results are achieved, and the white pigmentation of the polyamide layer results in a laminate with a dull surface.

EXAMPLE 4

Example 2 is repeated, except that a TiO$_2$ masterbatch is added to the polyethylene. Similar results are noted, and the white pigmentation of the polyamide layer results in a laminate with a dull surface.

It can be seen that the present invention provides a process for obtaining a thin film of a plastic on a fabric in a simple and cost-effective manner.

What is claimed is:

1. A thin film lamination-delamination process comprising the steps of:
   a) providing a plastic support layer having first and second surfaces, said plastic support layer comprising a material selected from the group consisting of polyolefins, polyamides, polyesters, polyvinyl chloride, ethylene vinyl acetate, cyclo olefin polymers, and blends thereof;
   b) coextruding at least one thin plastic base layer, having first and second surfaces, onto at least one surface of said support layer, with the first surface of said at least one thin base layer in contact with a surface of said support layer, said thin plastic base layer having a thickness of from about 1 µm to about 10 µm and comprising a material selected from the group consisting of polyolefins, polyesters, polyamides, polyurethanes, polycarbonates, thermoplastic elastomers, high temperature polymers, and blends thereof;
   c) applying an adhesive layer onto the second surface of said base layer;
   d) attaching the base layer to a fabric via the adhesive layer whereby the adhesive bond strength between said base layer and said fabric is at least 3 times the interlayer bond strength between said base layer and said support layer; and
   e) separating the support layer from the base layer, such that the base layer remains attached to the fabric.

2. The process of claim 1 further comprising the steps of f) coextruding a second thin plastic base layer, having first and second surfaces, with said first surface of said second thin base layer in contact with a surface of said support layer that is opposite to the surface with which said at least one thin base layer is in contact, g) applying a second adhesive layer onto the second surface of said second thin base layer, h) attaching said second thin base layer to a second fabric via said second adhesive layer, and i) separating said support layer from said second base layer such that said second base layer remains attached to said second fabric.

3. The process of claim 1 wherein the interlayer bond strength between said base layer and said support layer is about 35 g/cm or less.

4. The process of claim 1 wherein said base layer comprises a polyethylene.

5. The process of claim 1 wherein said support layer comprises a polyamide.

6. The process of claim 1 further comprising metallizing said second surface of said base layer prior to applying said adhesive.

7. The process of claim 1 wherein said adhesive layer comprises a material selected from the group consisting of polyurethanes, epoxies, polyesters, acrylics, anhydride modified polyolefin and blends thereof.

8. The process of claim 1 wherein said fabric comprises a non-woven fabric.

9. The process of claim 1 wherein said support layer has a thickness of from about 25 μm to about 50 μm.

10. The process of claim 1 wherein said base layer has a thickness of from about 4 μm to about 7 μm.

11. A thin film lamination-delamination process comprising the steps of:
   a) providing a plastic support layer having first and second surfaces, said plastic support layer comprising a polyamide;
   b) coextruding at least one thin plastic base layer, having first and second surfaces, onto at least one surface of said support layer, with the first surface of said at least one thin base layer in contact with a surface of said support layer, said thin plastic base layer having a thickness of from about 1 μm to about 10 μm and comprising a polyethylene;
   c) applying an adhesive layer onto the second surface of said base layer;
   d) attaching the base layer to a fabric via the adhesive layer whereby the adhesive bond strength between said base layer and said fabric is at least 3 times the interlayer bond strength between said base layer and said support layer; and
   e) separating the support layer from the base layer, such that the base layer remains attached to the fabric.

12. The process of claim 11 wherein said polyamide comprises polyamide 6.

13. The process of claim 12 wherein said polyethylene comprises a low density polyethylene.

14. The process of claim 11 wherein the interlayer bond strength between said base layer and said support layer is about 35 g/cm or less.

15. The process of claim 11 further comprising metallizing said second surface of said base layer prior to applying said adhesive.

16. The process of claim 11 wherein said adhesive layer comprises a polyurethane.

17. The process of claim 11 wherein said fabric comprises a non-woven fabric.

18. The process of claim 11 wherein said support layer has a thickness of from about 25 μm to about 50 μm.

19. The process of claim 11 wherein said base layer has a thickness of from about 4 μm to about 7 μm.

20. The process of claim 11 wherein said base layer has a width of over 90 inches.

21. A thin film lamination-delamination process comprising the steps of:
   a) providing a plastic support layer having first and second surfaces, said plastic support layer comprising a polyamide;
   b) coextruding at least one thin plastic base layer, having first and second surfaces, onto at least one surface of said support layer, with the first surface of said at least one thin base layer in contact with a surface of said support layer, said thin plastic base layer having a thickness of from about 1 μm to about 10 μm and comprising a polyethylene;
   c) applying an adhesive layer onto the second surface of said base layer;
   d) attaching the base layer to a non-woven fabric via the adhesive layer whereby the adhesive bond strength between said base layer and said fabric is at least 3 times the interlayer bond strength between said base layer and said support layer, and wherein the interlayer bond strength between said base layer and said support layer is about 35 g/cm or less; and
   e) separating the support layer from the base layer, such that the base layer remains attached to the non-woven fabric.

* * * * *